(12) United States Patent
Zhang et al.

(10) Patent No.: US 9,153,235 B2
(45) Date of Patent: Oct. 6, 2015

(54) TEXT DEPENDENT SPEAKER RECOGNITION WITH LONG-TERM FEATURE BASED ON FUNCTIONAL DATA ANALYSIS

(71) Applicants: Chenhao Zhang, Beijing (CN); Ruxin Chen, Redwood City, CA (US); Thomas Fang Zheng, Beijing (CN)

(72) Inventors: Chenhao Zhang, Beijing (CN); Ruxin Chen, Redwood City, CA (US); Thomas Fang Zheng, Beijing (CN)

(73) Assignee: Sony Computer Entertainment Inc., Tokyo (JP)

( * ) Notice: Subject to any disclaimer, the term of this patent is extended or adjusted under 35 U.S.C. 154(b) by 230 days.

(21) Appl. No.: 13/799,647

(22) Filed: Mar. 13, 2013

(65) Prior Publication Data
US 2013/0268272 A1 Oct. 10, 2013

Related U.S. Application Data

(60) Provisional application No. 61/621,810, filed on Apr. 9, 2012.

(51) Int. Cl.
*G10L 17/00* (2013.01)
*G10L 17/02* (2013.01)
(Continued)

(52) U.S. Cl.
CPC ............ *G10L 17/00* (2013.01); *G10L 17/02* (2013.01); *G10L 17/08* (2013.01); *G10L 17/24* (2013.01)

(58) Field of Classification Search
CPC ............ G01R 31/11; G01R 31/31937; G01R 23/165; G01R 27/2647; H04R 3/04; H04W 84/18; G06F 13/364; G06F 13/42; H04B 7/10; H01L 2924/0002

USPC .......................... 704/243; 702/51, 60, 61, 65
See application file for complete search history.

(56) References Cited

U.S. PATENT DOCUMENTS

| 4,956,865 A | 9/1990 | Lennig et al. |
| 4,977,598 A | 12/1990 | Doddington et al. |

(Continued)

FOREIGN PATENT DOCUMENTS

| EP | 0866442 | 9/1998 |
| JP | 09290617 | 11/1997 |

(Continued)

OTHER PUBLICATIONS

Bocchieri, "Vector Quantization for the efficient Computation of Continuous Density Likelihoods", Apr. 1993, International conference on Acoustics, Speech, and signal Processing, IEEE, pp. 692-695.

(Continued)

*Primary Examiner* — Charlotte M Baker
(74) *Attorney, Agent, or Firm* — Joshua D. Isenberg; JDI Patent

(57) ABSTRACT

One or more test features are extracted from a time domain signal. The test features are represented by discrete data. The discrete data is represented for each of the one or more test features by a corresponding one or more fitting functions, which are defined in terms of finite number of continuous basis functions and a corresponding finite number of expansion coefficients. Each fitting function is compressed through Functional Principal Component Analysis (FPCA) to generate corresponding sets of principal components. Each principal component for a given test feature is uncorrelated to each other principal component for the given test feature. A distance between a set of principal components for the given test feature and a set of principal components for one or more training features with the processing system is calculated. The test feature is classified according to the distance calculated with the processing system.

13 Claims, 5 Drawing Sheets

(51) Int. Cl.
*G10L 17/08* (2013.01)
*G10L 17/24* (2013.01)

(56) References Cited

U.S. PATENT DOCUMENTS

| | | |
|---|---|---|
| RE33,597 E | 5/1991 | Levinson et al. |
| 5,031,217 A | 7/1991 | Nishimura |
| 5,050,215 A | 9/1991 | Nishimura |
| 5,129,002 A | 7/1992 | Tsuboka |
| 5,148,489 A | 9/1992 | Erell et al. |
| 5,222,190 A | 6/1993 | Pawate et al. |
| 5,228,087 A | 7/1993 | Bickerton |
| 5,345,536 A | 9/1994 | Hoshimi et al. |
| 5,353,377 A | 10/1994 | Kuroda et al. |
| 5,438,630 A | 8/1995 | Chen et al. |
| 5,455,888 A | 10/1995 | Iyengar et al. |
| 5,459,798 A | 10/1995 | Bailey et al. |
| 5,473,728 A | 12/1995 | Luginbuhl et al. |
| 5,502,790 A | 3/1996 | Yi |
| 5,506,933 A | 4/1996 | Nitta |
| 5,509,104 A | 4/1996 | Lee et al. |
| 5,535,305 A | 7/1996 | Acero et al. |
| 5,581,655 A | 12/1996 | Cohen et al. |
| 5,602,960 A | 2/1997 | Hon et al. |
| 5,608,840 A | 3/1997 | Tsuboka |
| 5,615,296 A | 3/1997 | Stanford et al. |
| 5,617,486 A | 4/1997 | Chow et al. |
| 5,617,509 A | 4/1997 | Kushner et al. |
| 5,627,939 A | 5/1997 | Huang et al. |
| 5,649,056 A | 7/1997 | Nitta |
| 5,649,057 A | 7/1997 | Lee et al. |
| 5,655,057 A | 8/1997 | Takagi |
| 5,677,988 A | 10/1997 | Takami et al. |
| 5,680,506 A | 10/1997 | Kroon et al. |
| 5,680,510 A | 10/1997 | Hon et al. |
| 5,719,996 A | 2/1998 | Chang et al. |
| 5,745,600 A | 4/1998 | Chen et al. |
| 5,758,023 A | 5/1998 | Bordeaux |
| 5,787,396 A | 7/1998 | Komori et al. |
| 5,794,190 A | 8/1998 | Linggard et al. |
| 5,799,278 A | 8/1998 | Cobbett et al. |
| 5,812,974 A | 9/1998 | Hemphill et al. |
| 5,825,978 A | 10/1998 | Digalakis et al. |
| 5,860,062 A | 1/1999 | Taniguchi et al. |
| 5,880,788 A | 3/1999 | Bregler |
| 5,890,114 A | 3/1999 | Yi |
| 5,893,059 A | 4/1999 | Raman |
| 5,903,865 A | 5/1999 | Ishimitsu et al. |
| 5,907,825 A | 5/1999 | Tzirkel-Hancock |
| 5,930,753 A | 7/1999 | Potamianos et al. |
| 5,937,384 A | 8/1999 | Huang et al. |
| 5,943,647 A | 8/1999 | Ranta |
| 5,956,683 A | 9/1999 | Jacobs et al. |
| 5,963,903 A | 10/1999 | Hon et al. |
| 5,963,906 A | 10/1999 | Turin |
| 5,983,178 A | 11/1999 | Naito et al. |
| 5,983,180 A | 11/1999 | Robinson |
| 6,009,390 A | 12/1999 | Gupta et al. |
| 6,009,391 A | 12/1999 | Asghar et al. |
| 6,023,677 A | 2/2000 | Class et al. |
| 6,061,652 A | 5/2000 | Tsuboka et al. |
| 6,067,520 A | 5/2000 | Lee |
| 6,078,884 A | 6/2000 | Downey |
| 6,092,042 A | 7/2000 | Iso |
| 6,112,175 A | 8/2000 | Chengalvarayan |
| 6,138,095 A | 10/2000 | Gupta et al. |
| 6,138,097 A | 10/2000 | Lockwood et al. |
| 6,141,641 A | 10/2000 | Hwang et al. |
| 6,148,284 A | 11/2000 | Saul |
| 6,151,573 A | 11/2000 | Gong |
| 6,151,574 A | 11/2000 | Lee et al. |
| 6,188,982 B1 | 2/2001 | Chiang |
| 6,223,159 B1 | 4/2001 | Ishii |
| 6,226,612 B1 | 5/2001 | Srenger et al. |
| 6,236,963 B1 | 5/2001 | Naito et al. |
| 6,246,980 B1 | 6/2001 | Glorion et al. |
| 6,253,180 B1 | 6/2001 | Iso |
| 6,256,607 B1 | 7/2001 | Digalakis et al. |
| 6,292,776 B1 | 9/2001 | Chengalvarayan |
| 6,405,168 B1 | 6/2002 | Bayya et al. |
| 6,418,412 B1 | 7/2002 | Asghar et al. |
| 6,629,073 B1 | 9/2003 | Hon et al. |
| 6,662,160 B1 | 12/2003 | Wu et al. |
| 6,671,666 B1 | 12/2003 | Ponting et al. |
| 6,671,668 B2 | 12/2003 | Harris |
| 6,671,669 B1 | 12/2003 | Garudadri et al. |
| 6,681,207 B2 | 1/2004 | Garudadri |
| 6,691,090 B1 | 2/2004 | Laurila et al. |
| 6,801,892 B2 | 10/2004 | Yamamoto |
| 6,832,190 B1 | 12/2004 | Junkawitsch et al. |
| 6,868,382 B2 | 3/2005 | Shozakai |
| 6,901,365 B2 | 5/2005 | Miyazawa |
| 6,907,398 B2 | 6/2005 | Hoege |
| 6,934,681 B1 | 8/2005 | Emori et al. |
| 6,980,952 B1 | 12/2005 | Gong |
| 7,003,460 B1 | 2/2006 | Bub et al. |
| 7,133,535 B2 | 11/2006 | Huang et al. |
| 7,139,707 B2 | 11/2006 | Sheikhzadeh-Nadjar et al. |
| 7,454,341 B1 | 11/2008 | Pan et al. |
| 7,457,745 B2 | 11/2008 | Kadambe et al. |
| 7,941,313 B2 | 5/2011 | Garudadri et al. |
| 7,970,613 B2 | 6/2011 | Chen |
| 8,527,223 B2 * | 9/2013 | AbuAli et al. ............... 702/61 |
| 2004/0220804 A1 | 11/2004 | Odell |
| 2005/0010408 A1 | 1/2005 | Nakagawa et al. |
| 2010/0211391 A1 | 8/2010 | Chen |
| 2011/0137648 A1 | 6/2011 | Ljolje et al. |

FOREIGN PATENT DOCUMENTS

| | | |
|---|---|---|
| JP | 2000338989 | 8/2000 |
| RU | 2291499 C2 | 1/2007 |

OTHER PUBLICATIONS

G. David Forney, Jr., "The Viterbi Agorithm"—Proceeding of the IEEE, vol. 61, No. 3, p. 268-278, Mar. 1973.
Hans Werner Strube, "Linear Prediction on a Warped Frequency Scale,"—The Journal of the Acoustical Society of America, vol. 68, No. 4, p. 1071-1076, Oct. 1980.
International Search Report and Written Opinion of the International Searching Authority for PCT/US2013/03342 mailed Jul. 11, 2013.
J.O. Ramsay and B.W. Silverman, "Applied Functional Data Analysis—Method and Case Studies," Springer, 2002.
Kai-Fu Lee et al., "Speaker-Independent phone Recognition Using Hidden Markov Models"—IEEE Transaction in Acoustics, Speech, and Signal Processing, vol. 37, No. 11, p. 1641-1648, Nov. 1989.
Lawrence Rabiner, "A Tutorial on Hidden Markov Models and Selected Application Speech Recognition"—Proceeding of the IEEE, vol. 77, No. 2, Feb. 1989.
Leonard E. Baum et al., "A Maximization Technique Occurring in the Statistical Analysis of Probabilistic Functions of Markov Chains,"—The Annals of Mathematical Statistics, vol. 41, No. 1, p. 164-171, Feb. 1970.
Li Lee et al., "Speaker Normalization Using Efficient Frequency Warping Procedures" 1996 IEEE, vol. 1, pp. 353-356.
M. Gubian, F. Cangemi and L. Boves, "Automatic and Data Driven Pitch Contour Manipulation with Functional Data Analysis," Speech Prosody, 2010, Chicago.
M. Gubian, F. Cangemi and L. Boves, "Joint analysis of F0 and speech rate with functional data analysis," ICASSP 201, Prague.
Mullensiefen Daniel, Statistical techniques in music psychology: An update [online] [retrireved on Jun. 7, 2013]. Retrieved from the Internet: <URL: http://www.doc.gold.ac.uk/~mas03dm/papers/SchneiderFest09_MupsyStats.pdf>, p. 13, paragraph 3, p. 14, paragraph 1.
Rohit Sinha et al., "Non-Uniform Scaling Based Speaker Normalization" 2002 IEEE, May 13, 2002, vol. 4, pp. I-589-I-592.
Steven B. Davis et al., "Comparison of Parametric Representations for Monosyllabic Word Recognition in Continuously Spoken Sentences"—IEEE Transactions on Acoustics, Speech, and Signal Processing, vol. ASSP 28, No. 4, p. 357-366, Aug. 1980.

(56) References Cited

OTHER PUBLICATIONS

U.S. Appl. No. 61/621,810, entitled "Text Dependent Speaker RecognitionWith Long-Term Feature Based on Functional Data Analysis" to Zhang et al., filed Apr. 9, 2012.

Vasilache, "Speech recognition Using HMMs With Quantized Parameters", Oct. 2000, 6th International Conference on Spoken Language Processing (ICSLP 2000), pp. 1-4.

* cited by examiner

TEXT DEPENDENT SPEAKER RECOGNITION WITH LONG-TERM FEATURE BASED ON FUNCTIONAL DATA ANALYSIS

PRIORITY CLAIM

This application is a nonprovisional of and claims the priority benefit of commonly owned, co-pending U.S. Provisional Patent Application No. 61/621,810, to Zhang et al, filed Apr. 9, 2012, and entitled "TEXT DEPENDENT SPEAKER RECOGNITION WITH LONG-TERM FEATURE BASED ON FUNCTIONAL DATA ANALYSIS" the entire disclosures of which are incorporated herein by reference.

FIELD OF THE INVENTION

Embodiments of the present invention are related to speech technology, and more specifically to a text-dependent speaker recognition method and system based on Functional Data Analysis and Mel-Frequency Cepstral Coefficient features.

BACKGROUND OF THE INVENTION

In recent years, there has been an increasing interest in the field of speaker recognition. Speaker recognition is a process of automatically recognizing who is speaking by characteristics of an individual's voice, also called voice recognition. It has been developed for use in consumer electronic devices, such as mobile telephones, games platforms, personal computers and personal digital assistants. There are two major applications of speaker recognition technologies. Speaker verification involves determining whether a given voice belongs to a certain speaker. It is usually used to control access to restricted services, for example, access to computer networks, websites, online or telephone banking systems, online purchasing or voice mail, and access to secure equipment. Speaker identification involves matching a given voice to one of a set of known voices. No matter for which application, the goal of a speaker recognition system is to extract, characterize and recognize the information in the speech signal conveying speaker identity.

Speaker recognition technologies may be divided into two categories, text-dependent speaker recognition (TDSR) and text-independent speaker recognition (TISR). TDSR requires the speakers to provide utterances of the same text for both training and testing.

This text, known as "pass phrase," can be a piece of information such as a name, birth city, favorite color or a sequence of number. TISR recognizes a speaker without requiring a specific pass phrase. TDSR systems generally provide better recognition performance than TISR systems, especially for short training and testing utterances.

A TDSR system typically includes a computer or other electronic device equipped with a source of sound input, such as a microphone, to collect and interpret human speech. The collected speech waveform is converted into digital data representing signals at the discrete time intervals. The digitized speech data is processed to extract voice features that convey speaker information. For example, information about the speaker's vocal tract shape via the resonances and glottal source via the pitch harmonic may be included in the speech spectrum. The voice features are usually in a form of a sequence of acoustic vectors. In training sessions, the voice features extracted from the speech signal are used to create a model or template stored in a database. In testing sessions, the extracted features from the utterance are then compared to the reference features in the database that are obtained from the previous training sessions to find an optimal match for the given features. As an example, dynamic time warping (DTW) is one of the common modeling techniques to align and measure the similarity between the test phrase and the templates in the database.

Mel-Frequency Cepstral Coefficient (MFCC) is one of the known methods for extraction of the best parametric representation of acoustic signals. It offers a compact representation of the speech spectral envelops or the impact of the vocal tract shape in rendering a particular sound. It however only captures a highly local portion of the significant temporal dynamics and thus cannot reflect some overall statistical characteristics hidden behind the sentence.

Some researches and developments have been focused on Functional Data Analysis (FDA). FDA is about analysis of information on curves or surfaces, or anything else varying over a continuum. It provides both visual and quantitative results. In recent years, it has been proved that FDA shows good performance on the speech feature analysis and pitch re-synthesis.

It is within this context that embodiments of the present invention arise.

BRIEF DESCRIPTION OF THE DRAWINGS

Embodiments of the present invention can be readily understood by referring to the following detailed description in conjunction with the accompanying drawings.

DESCRIPTION OF THE SPECIFIC EMBODIMENTS

Figure 1:
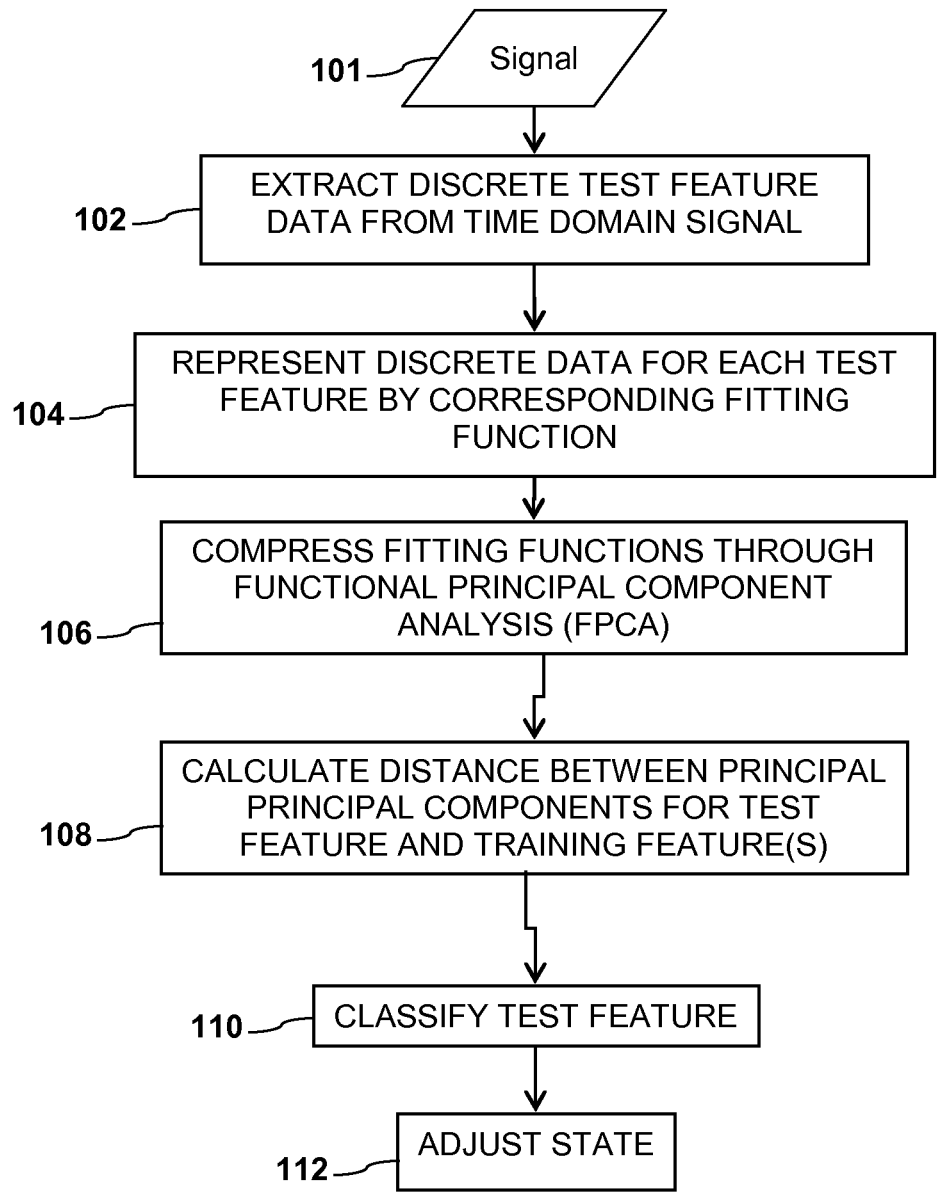
FIG. 1 is a flow diagram illustrating a text-dependent speaker recognition method according to an embodiment of the present invention.

Application of embodiments of the present invention described herein to the particular case of recognition algorithms, such as speech recognition, image recognition, or pattern recognition can be seen from the flow diagram of algorithm 100 of FIG. 1. Specifically, at 102, a time domain signal 101 (e.g., an audio or video signal) may be analyzed to extract N different test features $x_0 \ldots x_n$, where $n=N-1$, and N is one or more. The test features can be represented as discrete data. By way of example and not by way of limitation, the discrete data may be in the form of a vector having components $x_0 \ldots x_n$. These components may be spectral, cepstral, or temporal features of a given observed speech signal.

By way of example and without limitation of the embodiments of the invention, the components $x_0 \ldots x_n$ may be cepstral coefficients of a speech signal. A cepstrum (pronounced "kepstrum") is the result of taking the Fourier transform (FT) of the decibel spectrum as if it were a signal. The cepstrum of a time domain speech signal may be defined verbally as the Fourier transform of the log (with unwrapped phase) of the Fourier transform of the time domain signal. The cepstrum of a time domain signal S(t) may be represented mathematically as FT(log(FT(S(t))+j2πq), where q is the integer required to properly unwrap the angle or imaginary part of the complex log function. Algorithmically: the cepstrum may be generated by the sequence of operations: signal→FT→log→phase unwrapping→FT→cepstrum.

There is a compext cepstrum and a real cepstrum. The real cepstrum uses the logarithm function defined for real values, while the complex cepstrum uses the complex logarithm function defined for complex values also. The complex cepstrum holds information about magnitude and phase of the initial spectrum, allowing the reconstruction of the signal. The real cepstrum only uses the information of the magnitude of the spectrum. By way of example and without loss of generality, the algorithm 100 may use the real cepstrum.

The cepstrum can be seen as information about rate of change in the different spectrum bands. For speech recognition applications, the spectrum is usually first transformed using the Mel Frequency bands. The result is called the Mel Frequency Cepstral Coefficients or MFCCs. A frequency f in hertz (cycles per second) may be converted a dimensionless pitch m according to: $m=1127.01048 \log_e(1+f/700)$. Similarly a mel pitch can be converted to a frequency in hertz using: $f=700(e^{m/1127.01048}-1)$.

In the case of speech recognition, certain patterns of combinations of features $x_0 \ldots x_n$ may correspond to units of speech (e.g., words) or sub-units, such as syllables, phonemes or other sub-units of words. The features may also contain information characteristic of the source of the signal, e.g., characteristic of the speaker in the case of speech recognition. In accordance with aspects of the present invention, the system may represent the discrete data for each of the test features by a corresponding fitting function, as indicated at 104. Each fitting function may be defined in terms of a finite number of continuous basis functions and a corresponding finite number of expansion coefficients. The fitting functions may be compressed through Functional Principal Component Analysis (FPCA) to generate corresponding sets of principal components of the fitting functions for each test feature, as indicated at 106. Each principal component for a given test feature is uncorrelated to each other principal component for the given test feature. The system may then calculate a distance between a set of principal components for the given test feature and a set of principal components for one or more training features, as indicated at 108. The test feature may then be classified according to the distance calculated, as indicated at 110. A state of the system may then be adjusted according to a classification of the test feature determined from the distance calculated, as indicated at 112.

The Basis Functions

As mentioned above in connection with 104 of FIG. 1, a fitting function may be defined in terms of a finite number of continuous basis functions and a corresponding finite number of expansion coefficients. By way of example and not by way of limitation, the fitting function $x_i(t)$ representing the data may be defined in terms of a basis function expansion, which may be expressed in mathematical notation as in equation (2) below.

$$x_i(t) = \sum_{k=1}^{K} c_{ik} \phi_k(t) = c_i' \phi(t) \tag{2}$$

In equation (2) the functions $\phi_k, k=1, \ldots K$ are a set basis functions and the parameters $c_{i1}, c_{i2}, \ldots, c_{iK}$ are coefficients of the expansion. By way of example, and not by way of limitation, the basis functions may be Fourier basis functions that simulate the MFCC features. The Fourier basis functions may be defined as: $\phi_0(t)=1$, $\phi_{2r-1}(t)=\sin r\omega t$, $\phi_{2r}(t)=\cos r\omega t$. These basis functions may be uniquely determined through defining the number of the basis function K and the period $\omega$.

The Solution to the Calculation of the Expansion Coefficients

After the basis functions are decided, the $x_i(t)$ may be defined by the coefficients $c_{i1}, c_{i2}, \ldots, c_{iK}$. The data fitting level may be determined the sum of squared errors (SSE) or residual between the discrete data for a feature and a corresponding fitting function. The SSE or residual may be defined as in equation (3) below.

$$SSE(y_i \mid c) = \sum_{j=1}^{n} \left[ y_{ij} - \sum_{k=1}^{K} c_{ik} \phi_k(t_j) \right]^2 \tag{3}$$

By way of example and not by way of limitation, the classic least square method shown in Eq (3) above may be used to solve this minimization problem.

Roughness Penalty Method

When the number of the basis function K is too big or too small, it may result in overfitting or underfitting problems for the least square method. A roughness penalty method may be applied to improve the functional fitting problem. The roughness penalty method solves the fitting issue based on the closeness of the fit and existence of the overfitting, i.e., to make sure there is no dramatic changes in a local range.

Solving the fitting issues based on the closeness of the fit may be settled well by minimizing the squared errors. On the other hand, the integration of square of the second derivate may measure the existence of the overfitting, which may be expressed as:

$$PEN_2(x) = \int \{D^2 x(s)\}^2 ds = \|D^2 x\|^2 \tag{4}$$

Since these two goals are opposite, the middle ground of SSE and $PEN_2$ should be taken. Finally, the criterion can be built as:

$$PENSSE_\lambda = \sum_j \{y_i - x(t_j)\}^2 + \lambda * PEN_2(x) \tag{5}$$

Where $\lambda$ is a smoothing parameter to control the level between SSE and PEN. When $\lambda$ is small, the estimation will be toward to SSE. When the smoothing parameter $\lambda$ becomes bigger, the estimation there will be a higher roughness penalty and the curve will be smoother.

Choosing of Smoothing Parameter $\lambda$

Using the Roughness Penalty method may come up with a new issue with respect to the selection of the number of basis function K and the smoothing parameter $\lambda$. In one example, the Generalized Cross-Validation measure GCV may locate a best value for these parameters to define the basis function and the residual criterion. Details of discussions on Generalized Cross-Validation may be found in M. Gubian, F. Cangemi and L. Boves, "Automatic and Data Driven Pitch Contour Manipulation with Functional Data Analysis," Speech Prosody, 2010, Chicago, and fully incorporated herein by reference for all purposes. Generally, the smaller the GCV value is, the better the fitting will be. The definition of the GCV values may be express as:

$$GCV(\lambda) = \left(\frac{n}{n - df(\lambda)}\right)\left(\frac{SSE}{n - df(\lambda)}\right) \quad (6)$$

This GCV value may provide the direction on which value of $\lambda$ and the basis number K may give a better fitting level. Details of discussions on GCV values may be found in J. O. Ramsay and B. W. Silverman, "Applied Functional Data Analysis—Method and Case Studies," Springer, 2002, and fully incorporated herein by reference for all purposes.

Functional Principal Component Analysis

As mentioned above in association with 106 of FIG. 1, FPCA performs compression on the fitting functions. The FPCA is based on the traditional Principal Component Analysis (PCA). Traditional PCA uses a linear combination as in equation (7) below:

$$f_i = \beta_1 x_{i1} + \beta_2 x_{i2} + \ldots + \beta_p x_{ip} = \sum_{j=1}^{p} \beta_j x_{ij} \quad (7)$$

In equation (7) $f_i$ is the i-th principal component for the data. Each succeeding component in turn has the highest variance possible under the constraint that it is uncorrelated with the preceding components. In FPCA, the continuous function $x_i(t), t \in [0,T]$ may be considered as one variable as in equation (8) below:

$$f_i' = \int_0^T \beta(s) x_i(s) ds = \int \beta x_i \quad (8)$$

In equation (8), the function $\beta(s)$ corresponds to the linear weighting coefficients $(\beta_1, \beta_2, \ldots, \beta_p)$, and $f'_i$ is the i-th functional principal component for the functional data $x_i(t)$.

The problem of finding the principle components $f_i'$ may be abstractly expressed as set forth in equation (9) below.

$$\begin{cases} \max \text{Var}(f') = \frac{1}{N} \sum_{i=1}^{N} \left(\int \beta x_i\right)^2 \\ \text{s.t} \int [\beta(s)]^2 ds = \|\beta\|^2 = 1 \end{cases} \quad (9)$$

Equation (9) explains how to calculate the weighting function $\beta(s)$ that is used to obtain the principal components $f_i'$ in FCPA. More specifically, equation (9) describes a criterion which is needed to be optimized for the purpose of determining the best weight function $\beta(s)$. The first equation of (9) is an optimization target and the second one is a constraint condition.

The principal components $f_i'$ contain compressed data information in the fitting functions $x_i(t)$ for the test features from the original function data. Thus, by compressing the fitting functions $x_i(t)$ using FCPA one may generate corresponding sets of principal components $f_i'$ for each test feature.

Distance Measures

As mentioned above in associated with 108 of FIG. 1, the distance between two sets of principal components may be calculated to classify the test features in the input signal. By way of example and not by way of limitation, one of the common methods to calculate and measure the distance is Minkowski Distance ($d_{Mink}$) as shown below and its cosine similarity ($d_{cos}$) may be used in the classification phase. The distances $d_{Mink}$ and $d_{cos}$ are used separately in the experiments of experiments below.

$$\begin{cases} d_{Mink} = \sqrt[p]{\sum_{k=1}^{n} |x_{1k} - x_{2k}|^p} \\ d_{cos} = \frac{\sum_{k=1}^{n} x_{1k} x_{2k}}{\sqrt{\sum_{k=1}^{n} x_{1k}^2} \sqrt{\sum_{k=1}^{n} x_{2k}^2}} \end{cases} \quad (10)$$

It should be noted that other distance measures or similarity measurements may be applied. Details of discussions on distance measures may be found in M. Gubian, F. Cangemi and L. Boves, "Joint analysis of F0 and speech rate with functional data analysis," ICASSP 201, Prague, and fully incorporated herein by reference for all purposes.

Other distance measures that can be used include, but are not limited to:

The Manhattan Distance:

$$d_{Man} = \sqrt[1]{\sum_{k=1}^{n} |x_{1k} - x_{2k}|^1} = \sum_{k=1}^{n} |x_{1k} - x_{2k}|$$

The Chebyshev Distance:

$$d_{Che} = \lim_{p \to \infty} \sqrt[p]{\sum_{k=1}^{n} |x_{1k} - x_{2k}|^p} = \max_k (|x_{1k} - x_{2k}|)$$

It can be found that the Minkowski Distance (p) is a generalization of the Chebyshev Distance (p=1) and the Manhattan Distance (p->∞).

Application to Speech Recognition

As noted above in connection with 110 and 112 of FIG. 1, a computer system may use the determined classification of the test feature to trigger a change in state of the system. One example, among others of a change in state is related to use of aspects of the present disclosure in conjunction with speech recognition implemented on a computer system. In such a case, the input signal may be a digitized voice signal. The test features may be extracted from test signals for particular users speak particular words, phrases, sentences or other utterances. By way of example and not by way of limitation, the system may be configured to analyze an input speech signal to determine if the signal corresponds to a particular person speaking a particular utterance. The system may be programmed to change state when the signal is classified as corresponding to the particular user speaking the particular utterance. Examples of changes in state include, but are not limited to, turning the system on or off, turning one or more components of the system on or off, starting, pausing, or exiting a program, enabling or disabling entry of input to the system through another device, such as a keyboard, mouse, or game controller.

Text Dependent Speaker Recognition System

Figure 2:
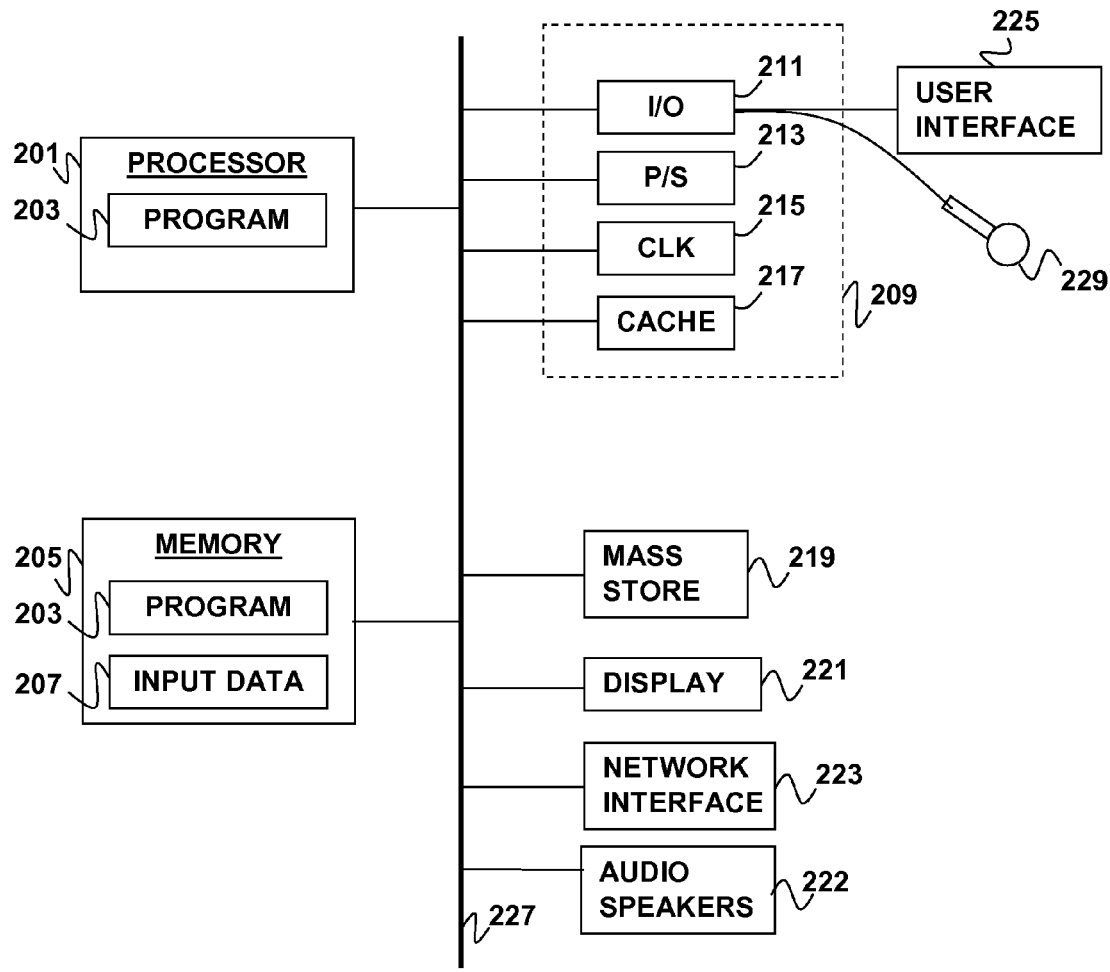
FIG. 2 is a block diagram illustrating a text-dependent speaker recognition system according to an embodiment of the present invention.

Embodiments of the invention may be implemented on a suitably configured computer apparatus. FIG. 2 illustrates a block diagram of a computer apparatus that may be used to implement a text-dependent speaker recognition method based on FDA and MFCC according to an embodiment of the present invention. The apparatus 200 generally may include a processor module 201 and a memory 205. The processor module 201 may include one or more processor cores.

The memory 205 may be in the form of an integrated circuit, e.g., RAM, DRAM, ROM, and the like. The memory 205 may also be a main memory that is accessible by all of the processor modules. In some embodiments, the processor module 201 may have local memories associated with each core. A program 203 may be stored in the main memory 205 in the form of processor readable instructions that can be executed on the processor modules. The program 203 may be configured to perform text-dependent speaker recognition methods as discussed above with respect to FIG. 1. The program 203 may be written in any suitable processor readable language, e.g., C, C++, JAVA, Assembly, MATLAB, FORTRAN, and a number of other languages. Input data 207 may also be stored in the memory. Such input data 207 may include the discrete data for each test feature from 104 of FIG. 1, or the generated principal components of the fitting functions for each test feature from 106 of FIG. 1. During execution of the program 203, portions of program code and/or data may be loaded into the memory or the local stores of processor cores for parallel processing by multiple processor cores.

The apparatus 200 may also include well-known support functions 209, such as input/output (I/O) elements 211, power supplies (P/S) 213, a clock (CLK) 215, and a cache 217. The apparatus 200 may optionally include a mass storage device 219 such as a disk drive, CD-ROM drive, tape drive, or the like to store programs and/or data. The device 200 may optionally include a display unit 221, audio speakers unit 222, and user interface unit 225 to facilitate interaction between the apparatus and a user. The display unit 221 may be in the form of a cathode ray tube (CRT) or flat panel screen that displays text, numerals, graphical symbols or images. The user interface 225 may include a keyboard, mouse, joystick, light pen, or other device that may be used in conjunction with a graphical user interface (GUI). The apparatus 200 may also include a network interface 223 to enable the device to communicate with other devices over a network, such as the internet.

In some embodiments, the system 200 may include an optional microphone 229, which may be a single microphone or a microphone array. The microphone 229 can be coupled to the processor 201 via the I/O elements 211. By way of example, and not by way of limitation, the input human utterances may be recorded using the microphone 229.

The components of the system 200, including the processor 201, memory 205, support functions 209, mass storage device 219, user interface 225, network interface 223, and display 221 may be operably connected to each other via one or more data buses 227. These components may be implemented in hardware, software or firmware or some combination of two or more of these.

Non-Transitory Computer-Readable Storage Medium

Figure 3:
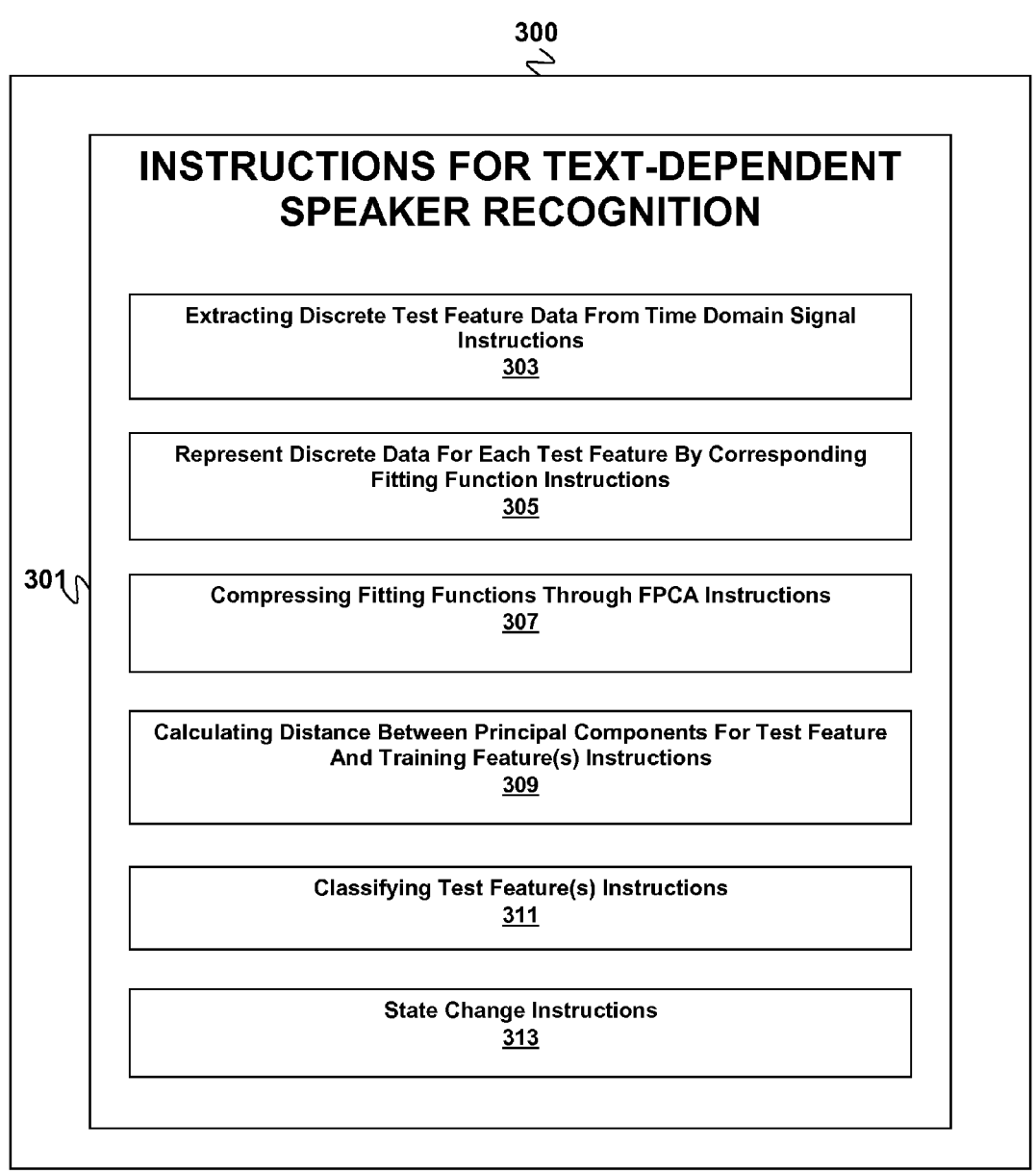
FIG. 3 illustrates an example of a non-transitory computer-readable storage medium with instructions for implementing a text-dependent speaker recognition method according to an embodiment of the present invention.

According to another embodiment, instructions for text-dependent speaker recognition based on FDA and MFCC features may be stored in a computer readable storage medium. By way of example, and not by way of limitation, FIG. 3 illustrates an example of a non-transitory computer readable storage medium 300 in accordance with an embodiment of the present invention. The storage medium 300 contains computer-readable instructions stored in a format that can be retrieved, interpreted, and executed by a computer processing device. By way of example, and not by way of limitation, the computer-readable storage medium 300 may be a computer-readable memory, such as random access memory (RAM) or read only memory (ROM), a computer readable storage disk for a fixed disk drive (e.g., a hard disk drive), or a removable disk drive. In addition, the computer-readable storage medium 300 may be a flash memory device, a computer-readable tape, a CD-ROM, a DVD-ROM, a Blu-Ray, HD-DVD, UMD, or other optical storage medium.

The storage medium 300 contains text-dependent speaker recognition instructions 301 configured for text-dependent speaker recognition based on FDA and MFCC features in accordance with the method described above with respect to FIG. 1. In particular, the instructions 301 may include extracting discrete test feature data instructions 303 that are used to extract discrete test feature data from time domain signals. The input human utterance may be obtained in computer-readable form from a recording or from sounds captured live at run time by a microphone or microphone array. The instructions 301 may further include representing discrete data for each test feature by corresponding fitting functions instructions 305 that represent discrete data by fitting functions.

The instructions 301 may also include compressing fitting function through FPCA instructions 307 that compress the fitting functions through FPCA to generate corresponding sets of principal components of the fitting functions for each test feature. Then the calculation instructions 309 calculate distance between principal components for test features and training features. The classification instructions 311 in turn classify test features based on the calculation. The state change instructions 313 may adjust a state of the system according to the classification.

Experiments and Results

A number of experiments were performed to test text-dependent speaker recognition based on FDA and MFCC features in accordance with an embodiment of the present invention against prior art speaker recognition techniques. In the experiments, there were five different speakers. Each speaker uttered about 240 different short words and each word was repeated three times. Every utterance was recorded for training purposes and all three recordings for the same word were used for verification. The length of each utterance was about 2 seconds in average, and every word was sampled at 16 kHz sampling rate with 16-bit width. The verification was passed only when the same speaker uttered the same word.

Figure 4:
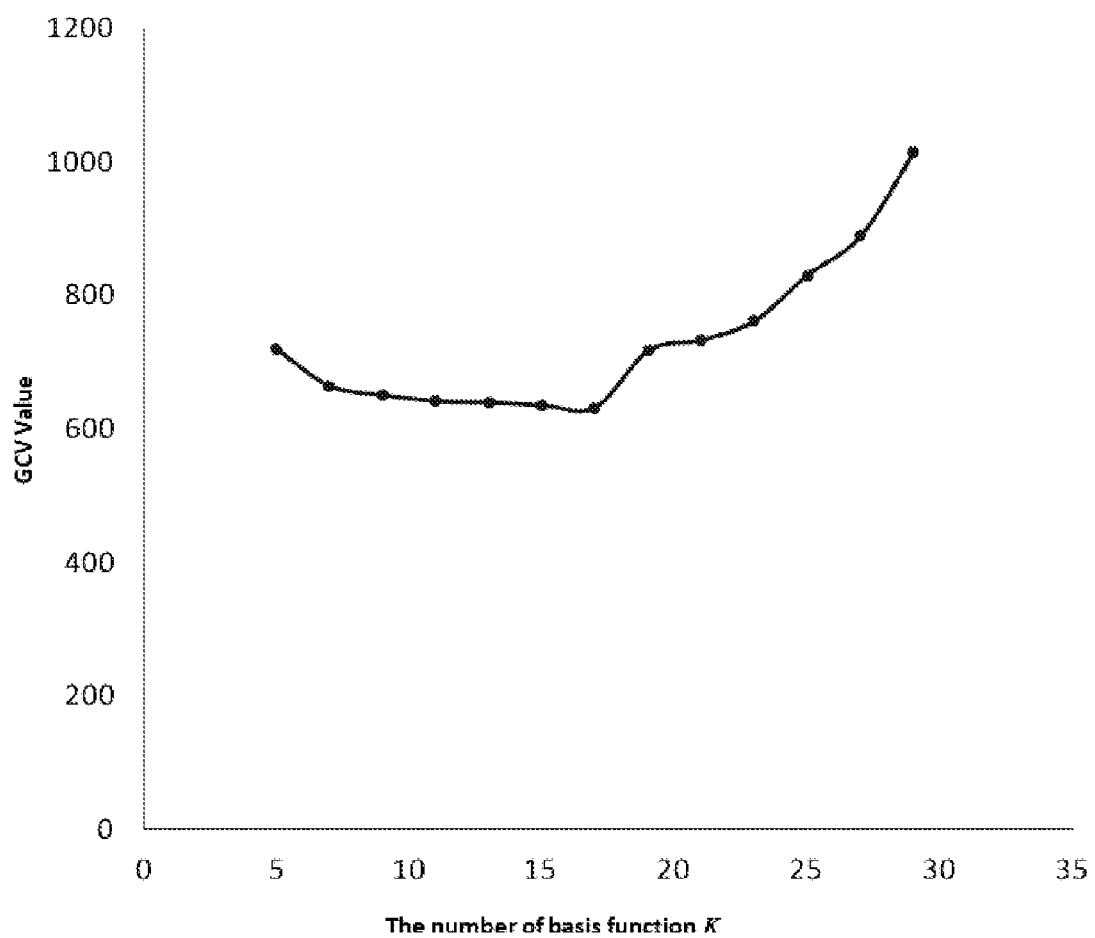
FIG. 4 shows values of the generalized cross-validation or GCV criterion for choosing the smoothing parameters according to an embodiment of the present invention.
Figure 5:
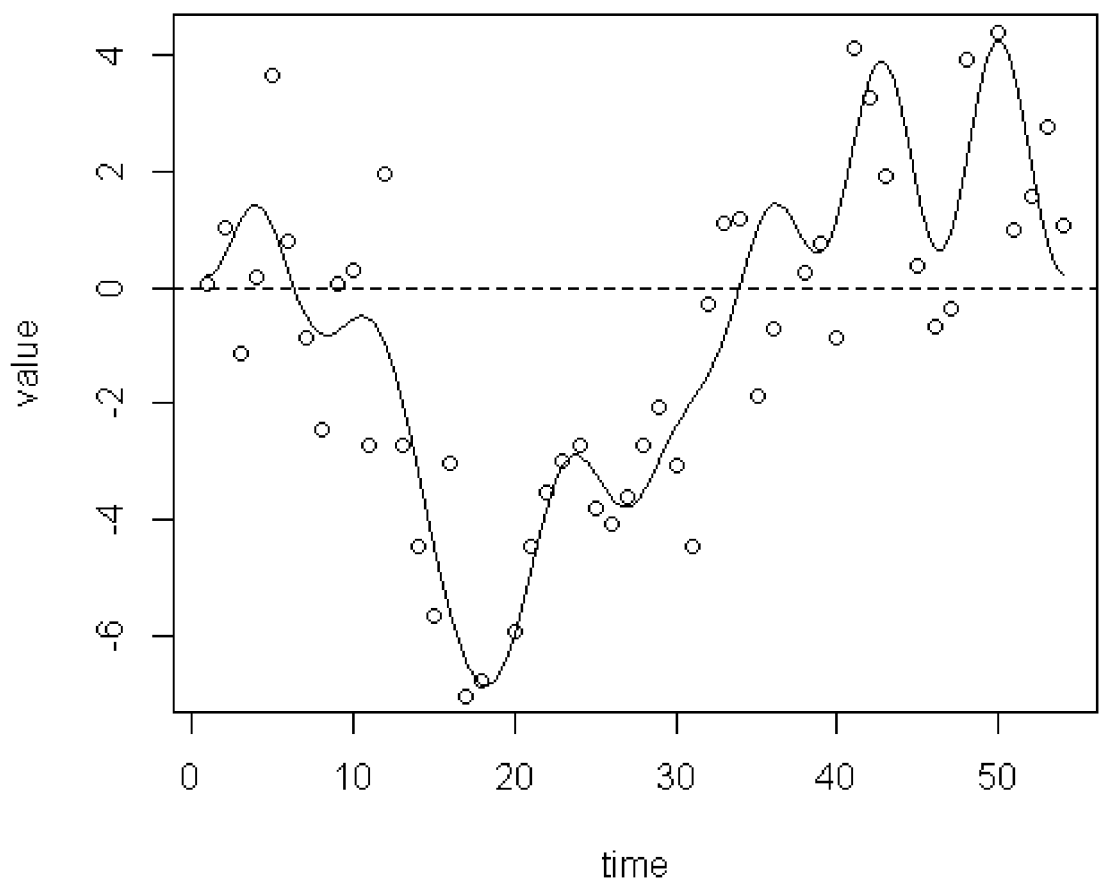
FIG. 5 shows one of the simulation results from one dimension of MFCC features according to an embodiment of the present invention.

The 16-dimensional MFCC features were extracted from the utterances with 30 triangular mel filters used in the MFCC calculation. For each frame, the MFCC coefficients and their first derivative formed a 32-dimensional feature vector. The Fourier basis functions were chosen to smooth the MFCC features. FIG. 4 shows the GCV values in connection with selection of smoothing parameters. According to the GCV values, the functional parameters were chosen as followed. The number of basis functions K was 17 and the smoothing parameter 2 is 10e-4. By defining the functional parameters, the roughness penalty criterion was used to calculate the coefficient set $c_{i1}, c_{i2}, \ldots, c_{iK}$. FIG. 5 shows one of the simulation results from one dimension of MFCC features.

The simulation results were compared to similar results for a Dynamic Time Warping system with MFCC features. This system is provided as an example of a classic technique for text-dependent speaker recognition. TABLE I shows the performances of the prior art system and an experiment that used the FDA coefficients as the features without FPCA compression and used traditional Euclidean Distance as the distance measure. The Equal Error Rate (EER) was used to evaluate the system performance.

TABLE I

| Method | EER |
|---|---|
| MFCC-DTW | 6.13% |
| MFCC-FDA | 9.54% |

From TABLE I, the performance of a system using the FDA coefficients without FPCA compression was not as good as the performance of the classic MFCC-DTW system. It may be resulting from some redundant information contained in the coefficients.

From the 240 words uttered by each speaker, the first fifty words (i.e., words 1-50) and words 100-150 were separately selected to run experiments for the purpose of testing the stability of FPCA. TABLE II and TABLE III show these results below, and where nharm represents the number of harmonics or principal components to compute.

TABLE II

| for word 1-50 | | | | | |
|---|---|---|---|---|---|
| Method | | EER (%) | | | |
| MFCC-DTW | | 7.43% | | | |
| MFCC-FPCA (nharm) | | | | | |
| | 1 | 3 | 5 | 7 | 9 |
| EER (%) | 12.28 | 8.10 | 7.83 | 7.53 | 7.29 |

TABLE III

| word 100-150 | | | | | |
|---|---|---|---|---|---|
| Method | | EER (%) | | | |
| MFCC-DTW | | 6.02 | | | |
| MFCC-FPCA (nharm) | | | | | |
| | 1 | 3 | 5 | 7 | 9 |
| EER (%) | 11.80 | 7.95 | 7.31 | 6.15 | 6.01 |

From TABLE II and TABLE III, the MFCC-FPCA system showed improvements on the equal error rate over the system without FPCA compression above in connection with TABLE I. The MFCC-FPCA system effectively reduced the redundant information, and the MFCC-FPCA system with Euclidean Distance as distance measure achieved an equivalent performance as the classic MFCC-DTW TDSR system.

At last, experiments on a MFCC-FPCA system with different similarity measurements were preformed. The words 100-150 were chosen for the experiments. The number of harmonics or principal components to compute (nharm) was 5. TABLE IV shows the results.

TABLE IV

| Similarity Measurement | Euclidean Distance | Manhattan Distance | Chebyshev Distance | Cosine Similarity |
|---|---|---|---|---|
| EER (%) | 7.31 | 7.06 | 9.62 | 2.49 |

As shown in TABLE IV, a MFCC-FPCA system with cosine similarity as the distance measure had the best performance result.

While the above is a complete description of the preferred embodiment of the present invention, it is possible to use various alternatives, modifications, and equivalents. Therefore, the scope of the present invention should be determined not with reference to the above description, but should, instead, be determined with reference to the appended claims, along with their full scope of equivalents. Any feature described herein, whether preferred or not, may be combined with any other feature described herein, whether preferred or not. In the claims that follow, the indefinite article "A" or "An" refers to a quantity of one or more of the item following the article, except where expressly stated otherwise. In the claims that follow, the word "or" is to be interpreted as a non-exclusive or, unless otherwise specified. The appended claims are not to be interpreted as including means-plus-function limitations, unless such a limitation is explicitly received in a given claim using the phrase "means for".

What is claimed is:

1. A method, comprising:
    extracting one or more test features from a time domain signal, wherein the one or more test features are represented by discrete data with a processing system;
    representing the discrete data for each of the one or more test features by a corresponding one or more fitting functions with the processing system, wherein each fitting function is defined in terms of a finite number of continuous basis functions and a corresponding finite number of expansion coefficients;
    compressing the fitting functions through Functional Principal Component Analysis (FPCA) with the processing system to generate corresponding sets of principal components of the fitting functions for each test feature, wherein each principal component for a given test feature is uncorrelated to each other principal component for the given test feature;
    calculating a distance between a set of principal components for the given test feature and a set of principal components for one or more training features with the processing system;
    classifying the test feature according to the distance calculated with the processing system; and
    adjusting a state of the processing system according to a classification of the test feature determined from the distance calculated.

2. The method of claim 1, wherein the time domain signal is a time domain speech signal.

3. The method of claim 2, wherein the one or more test features include one or more mel-frequency cepstral coefficient (MFCC) features.

4. The method of claim 1, wherein the time domain signal is a time domain speech signal and wherein classifying the test feature according to the distance calculated includes determining whether the time domain signal corresponds to a particular individual speaking a particular utterance.

5. The method of claim 1, wherein the each principal component is an integral of a product of a corresponding one of the one or more fitting functions with a weighting function.

6. The method of claim 1, wherein representing the discrete data for each of the one or more test features by a corresponding one or more fitting functions includes minimizing a sum of square errors between the discrete data for a feature and a corresponding fitting function.

7. The method of claim 1, wherein representing the discrete data for each of the one or more test features by a corresponding one or more fitting functions includes minimizing a quantity that includes a sum of square errors between the discrete data for a feature and a corresponding fitting function and an integral of the second derivative of the corresponding fitting function multiplied by a smoothing parameter.

8. The method of claim 1, wherein the one or more basis functions are Fourier basis functions.

9. A non-transitory computer readable medium having computer-executable instructions embodied therein, the instructions being configured to implement a method upon execution, the method comprising:
- extracting one or more test features from a time domain signal, wherein the one or more test features are represented by discrete data with a processing system;
- representing the discrete data for each of the one or more test features by a corresponding one or more fitting functions with the processing system, wherein each fitting function is defined in terms of a finite number of continuous basis functions and a corresponding finite number of expansion coefficients;
- compressing the fitting functions through Functional Principal Component Analysis (FPCA) with the processing system to generate corresponding sets of principal components of the fitting functions for each test feature, wherein each principal component for a given test feature is uncorrelated to each other principal component for the given test feature;
- calculating a distance between a set of principal components for the given test feature and a set of principal components for one or more training features with the processing system;
- classifying the test feature according to the distance calculated with the processing system;
- adjusting a state of the processing system according to a classification of the test feature determined from the distance calculated.

10. A system comprising:
a processor;
a memory;
a set of processor-executable instructions embodied in the memory, the instructions being configured to implement a method upon execution, the method comprising:
- extracting one or more test features from a time domain signal, wherein the one or more test features are represented by discrete data with a processing system;
- representing the discrete data for each of the one or more test features by a corresponding one or more fitting functions with the processing system, wherein each fitting function is defined in terms of a finite number of continuous basis functions and a corresponding finite number of expansion coefficients;
- compressing the fitting functions through Functional Principal Component Analysis (FPCA) with the processing system to generate corresponding sets of principal components of the fitting functions for each test feature, wherein each principal component for a given test feature is uncorrelated to each other principal component for the given test feature;
- calculating a distance between a set of principal components for the given test feature and a set of principal components for one or more training features with the processing system;
- classifying the test feature according to the distance calculated with the processing system;
- adjusting a state of the processing system according to a classification of the test feature determined from the distance calculated.

11. The system of claim 10, wherein the time domain signal is a time domain speech signal.

12. The system of claim 11, wherein the one or more test features include one or more mel-frequency cepstral coefficient (MFCC) features.

13. The system of claim 10, wherein the time domain signal is a time domain speech signal and wherein classifying the test feature according to the distance calculated includes determining whether the time domain signal corresponds to a particular individual speaking a particular utterance.

* * * * *